United States Patent
Schneider et al.

[11] Patent Number: 5,313,856
[45] Date of Patent: May 24, 1994

[54] MULTISTAGE TRANSMISSION AND SHIFTING PROCESS THEREFOR

[75] Inventors: Arthur Schneider, Braunschweig; Christian Klarhoefer, Wolfsburg, both of Fed. Rep. of Germany

[73] Assignee: Volkswagen AG, Wolfsburg, Fed. Rep. of Germany

[21] Appl. No.: 910,172

[22] PCT Filed: Dec. 17, 1990

[86] PCT No.: PCT/EP90/02217
§ 371 Date: Jul. 14, 1992
§ 102(e) Date: Jul. 14, 1992

[87] PCT Pub. No.: WO91/13271
PCT Pub. Date: Sep. 5, 1991

[30] Foreign Application Priority Data
Mar. 1, 1990 [DE] Fed. Rep. of Germany ....... 4006357

[51] Int. Cl.⁵ .............................................. F16H 61/08
[52] U.S. Cl. ..................................................... 477/80
[58] Field of Search ................ 74/664, 745, 863, 866; 476/19, 30, 32; 192/0.092, 52, 109 F

[56] References Cited

U.S. PATENT DOCUMENTS

| | | | |
|---|---|---|---|
| 3,442,346 | 5/1969 | Winter et al. | 74/745 X |
| 4,187,742 | 2/1980 | Achard | 74/863 |
| 4,529,072 | 7/1985 | Oguma et al. | 192/0.092 X |
| 4,544,057 | 10/1985 | Webster et al. | 192/0.076 |
| 4,627,312 | 12/1986 | Fujieda et al. | 74/866 |
| 4,790,418 | 12/1988 | Brown et al. | 192/0.0902 X |
| 4,823,643 | 4/1989 | Koshizawa | 74/866 |
| 4,860,607 | 8/1989 | Numazawa et al. | 74/330 |
| 4,884,667 | 12/1989 | Koga | 192/3.55 |
| 4,989,477 | 2/1991 | Hunter et al. | 74/866 |
| 5,014,573 | 5/1991 | Hunter et al. | 74/866 |
| 5,050,457 | 9/1991 | Takayama et al. | 74/866 |
| 5,070,747 | 12/1991 | Lentz et al. | 74/866 |
| 5,085,105 | 2/1992 | Wakahara et al. | 74/866 |

FOREIGN PATENT DOCUMENTS 0367020  5/1990  European Pat. Off. .

*Primary Examiner*—Dirk Wright
*Attorney, Agent, or Firm*—Brumbaugh, Graves, Donohue & Raymond

[57] ABSTRACT

A multistage transmission has a plurality of gear stages and an additional gear stage which may be engaged to transmit part of the input shaft torque before disengagement of an engaged gear stage. A friction clutch is used to engage the additional stage. Alternatively, a variable-ratio pulley connection may be used for the additional stage. Synchronization of the transmission input shaft with a gear stage to be engaged is attained by controlling the change in input shaft speed in accordance with a selected speed gradient.

15 Claims, 4 Drawing Sheets

MULTISTAGE TRANSMISSION AND SHIFTING PROCESS THEREFOR

BACKGROUND OF THE INVENTION

This invention relates to multistage transmissions and to processes for shifting multistage transmissions.

In conventional multistage transmissions having an input shaft and an output shaft arranged so that the output shaft is axially parallel to the input shaft and can be connected to the input shaft by a pair of gear wheels, the flow of torque from the drive engine through the transmission to the motor vehicle wheels must be interrupted when shifting into a new gear. The length of this interruption in driving force is determined by the period of time needed to synchronize the transmission gears which are to be engaged after shifting.

European Published Application No. 01 73 117 discloses a process for shifting a multistage transmission in which the driving torque of the engine is transmitted to the motor vehicle wheels through a temporary engageable gear stage during the interruption in driving force that occurs during the process of shifting to a higher gear. The temporary gear engagement takes place simultaneously with the interruption in driving force so that the driving torque of the engine is transferred in sequence first from the lower gear stage to the temporary gear stage and then to the higher gear stage in order to transmit a driving force during the shift-up process.

SUMMARY OF THE INVENTION

Accordingly, it is an object of the present invention to provide a process for shifting a multistage transmission which overcomes the disadvantages of the prior art.

Another object of the invention is to provide an improved shifting process for a multistage transmission in which the torque available for driving the motor vehicle during shifting has an especially favorable characteristic.

These and other objects of the invention are attained by partially engaging a temporary gear stage while the original gear stage is still engaged, disengaging the original gear stage while the temporary gear stage is at least partially engaged, and controlling the speed of the transmission input shaft as a function of an operating characteristic of the vehicle engine to synchronize the gears of the next gear stage to be engaged.

Thus, a gear stage for initiating the process of shifting up is engaged when the original gear stage is still engaged and the driving torque is divided in two paths in the multistage transmission. In other words, a portion of the torque is still transmitted through the original gear stage while the rest of the driving force is transmitted to the drive train through another gear stage. Finally, when the original gear stage is disengaged, e.g., after the driving torque transmitted through the path drops below a given level, only the other gear stage transmits the driving torque. Because of this branching of the driving torque, the torque available for driving the motor vehicle has an especially favorable characteristic.

At the same time, a change in the speed of the transmission input shaft is produced because of the driving torque transmitted through the additional gear stage. During this process, the transmission input shaft speed changes to a certain extent and this change has, for example, a negative speed gradient during the process of shifting up. As a result, a suitable driving torque is available at the transmission output even during the process of changing gears.

The process of shifting down is carried out similarly. In contrast to shifting up, the change in the speed of the transmission input shaft is positive because the input shaft turns at a faster speed in a lower gear than in a higher gear at the same driving speed. Accordingly, the change in speed has a positive gradient.

It is advantageous to provide feedback and control of this gradient for revising or adjusting the transmission input shaft speed. Deviation of the gradient from a given set point is thus minimized.

The gradient set point can be predetermined as a function of several other parameters. One of these parameters is the torque transmitted through the transmission input shaft before initiation of the shifting operation. This depends on the engine torque and on the inertia of all rotating parts upstream from the transmission input shaft and connected to it. Because the gradient set point depends on at least one of those torques, the torque to be transmitted over the additional gear stage must be between the torque transmitted before the shifting operation is initiated and the torque transmitted after the shifting operation is completed.

It is also advantageous to determine the set point of the gradient as a function of the original and/or the new gear stage. In this way, it is possible to assure that the torque conveyed through the additional gear stage is not greater or smaller than certain limit values.

In an especially advantageous embodiment of this invention, the set point of the gradient is reduced by the instantaneous value of the transmission input shaft speed before it reaches the synchronous speed. Reaching the synchronous speed means that the ratio of the speeds of the transmission input and output shafts corresponds to the transmission ratio of the gear stage to be engaged. Upon reaching the synchronous speed during the shifting operation, the new gear stage is engaged. The engagement process requires a certain finite time period. Within this time period, the input shaft speed should be as close as possible to the synchronous speed. For this purpose, the gradient is reduced before reaching the synchronous speed as mentioned above. The time available for engaging the new gear stage is thus lengthened.

The time at which the gradient is changed may be determined in various ways. It should also be pointed out that the gradient may be changed or in several steps.

In accordance with another aspect of the invention, a multistage transmission includes a device for controlling or regulating the change in speed of the transmission input shaft. Moreover, the transmission of the invention may include a gear stage having a gear ratio which is adjustable continuously or in stages so that it can be adjusted to the ratio of the gear stage to be engaged, thereby reducing heat and friction losses.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENTS

Figure 1:
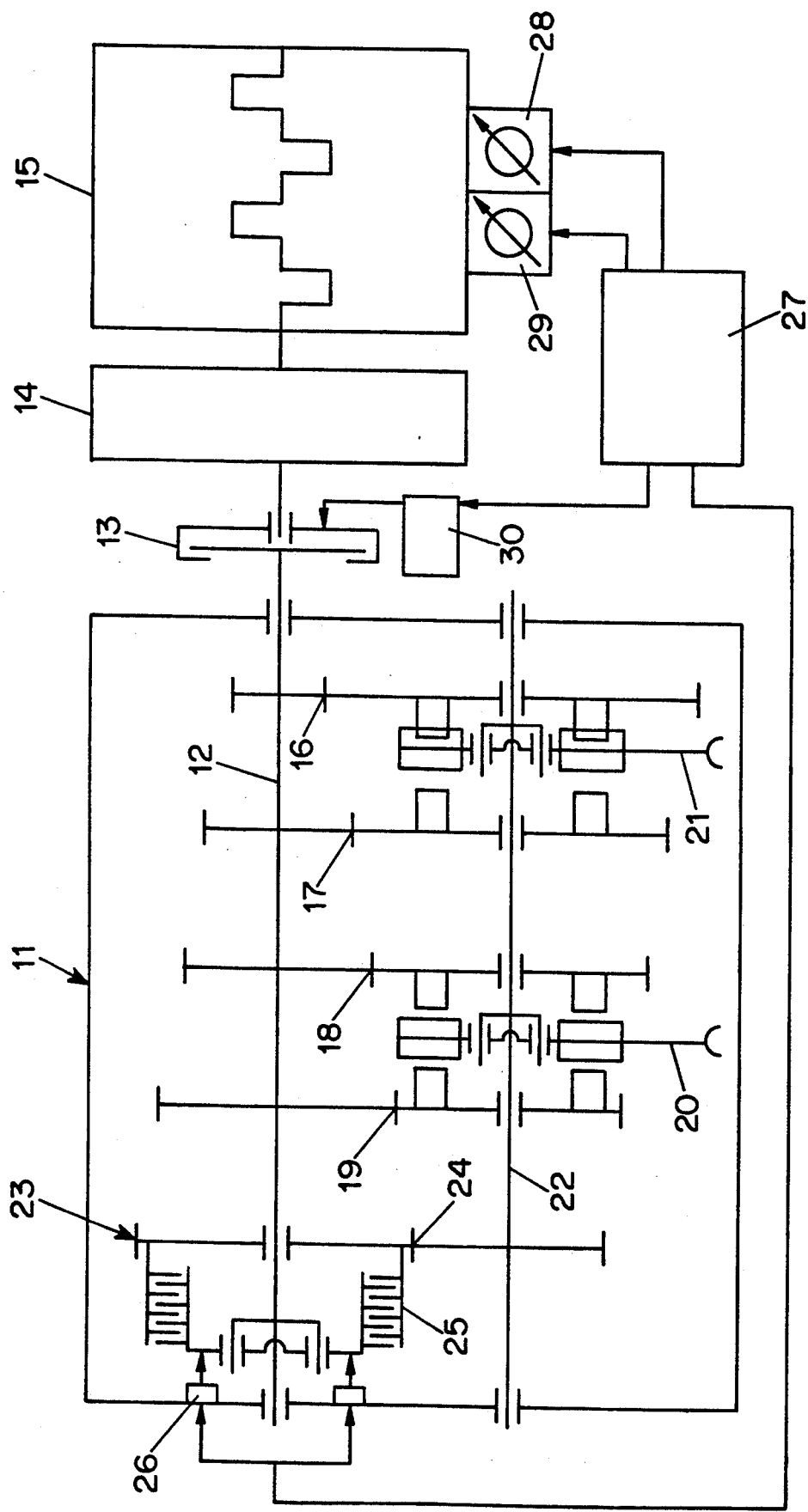
FIG. 1 is a schematic diagram illustrating a representative embodiment of a multistage transmission arranged according to the invention.

FIG. 1 shows schematically a typical embodiment of the invention including a multistage transmission 11 having an input shaft 12 connected by a start-up and separating clutch 13 to a flywheel 14 of a driving engine 15. The input shaft 12 can be connected to the transmission output shaft 22 which leads to the drive wheels of the vehicle, by each of a series of pairs of gears 16-19 corresponding to the transmission gear stages, and by the sliding sleeves 20 and 21. The transmission also has a further gear stage 23, consisting of a pair of gear wheels 24 and a clutch 25, which can be engaged between the gear input shaft 12 and the gear output shaft 22, providing the highest-ratio transmission gear.

The clutch 25 is shown as a multidisk clutch, but it could also be a cone clutch, a magnetic clutch or a hydrodynamic or hydrostatic clutch. In this embodiment, the torque transmitted by the multidisk clutch 25 can be set at a predetermined maximum level and the loose wheel of the pair of gear wheels 24 in this stage can be connected by the multidisk clutch 25 to the transmission input shaft 12. In this connection, the clutch 25 can be actuated by a first actuating device 26 even when there is a complete connection between the input shaft and the output shaft through another stage in the multistage transmission 11, as shown in FIG. 1, for example, by the first gear stage consisting of the gear wheel pair 16. Rather than using the highest available gear stage 24 as the temporary gear stage to be used in shifting, it is possible to provide an additional pair of gear wheels for this purpose.

According to the invention, the typical example of a multistage transmission 11 shown in FIG. 1 includes a control unit 27 and also has a torque control device 28 connected to the drive engine 15 and another torque control device 29 with a second actuating device 30 connected to the start-up and separating clutch 13. These components, as well as the first actuating device 26, can be controlled by the control unit 27.

Figure 2:
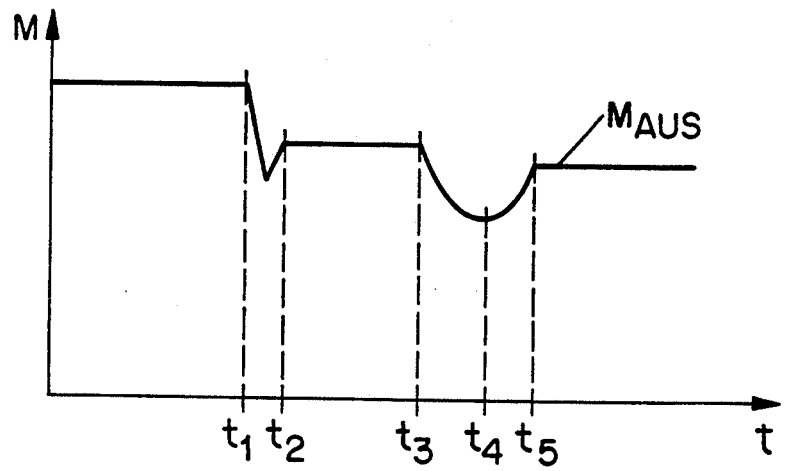
FIG. 2 is a graphical representation showing the variation of torque at the transmission output shaft during upshifting from first gear to second gear.
Figure 3:
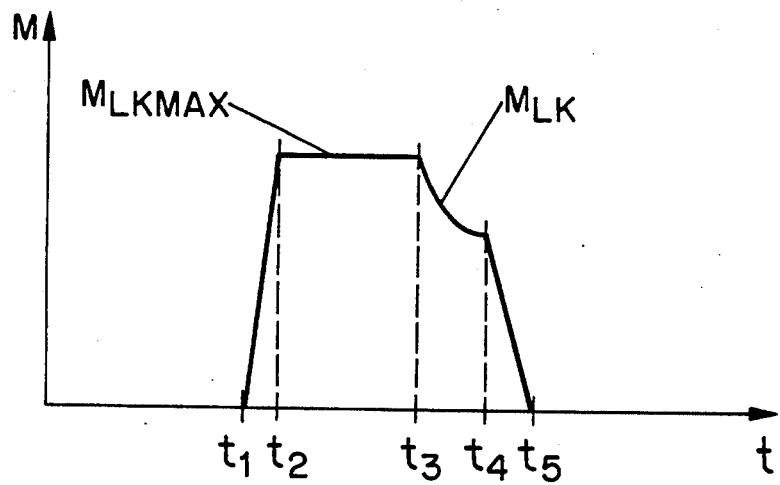
FIG. 3 is a graphical representation showing the variation of driving torque transmitted by a temporary gear stage during upshifting.
Figure 4:
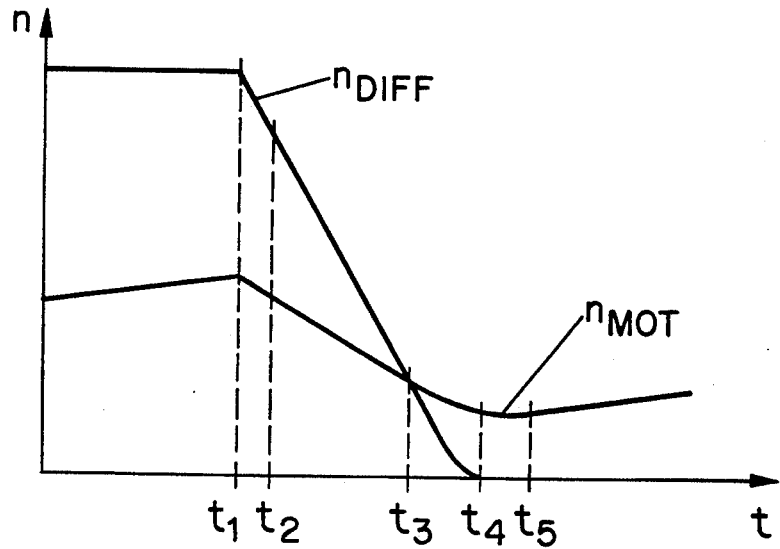
FIG. 4 is a graphical representation showing the variation of engine torque and of the difference between the transmission input shaft speed and the synchronous speed during upshifting.

The operation of the multistage transmission 11 described above will now be explained in greater detail with reference to the drawings. FIGS. 2-4 illustrate diagrammatically the variations of the torques and speeds during upshifting, for example, from the first gear stage to the second gear stage. The times $t_1$-$t_5$ are the same throughout FIGS. 2-4. The process of upshifting begins at the time $t_1$. By actuating the multidisk clutch 25 with the first actuating device 26, the additional gear stage 23 is selected. This stage has a higher transmission ratio than the first gear stage consisting of the gear wheel pair 16 which is shown engaged in FIG. 1. Consequently, the multidisk clutch 25 cannot be completely engaged in this phase of the shifting operation.

Because of the higher transmission ratio of the additional gear stage 23 in comparison with the engaged first gear stage, some torque is transmitted from the engine 15 to the transmission output shaft 22 by partial engagement of the multidisk clutch 25 and the amount of torque thus transmitted can be controlled by varying the pressure within the multidisk clutch 25. During this operation, the multidisk clutch 25 is controlled in such a way that the torque $M_{LK}$ which is transmitted through this stage is approximately the same as the torque being transmitted through the first gear stage which was previously engaged. The maximum torque $M_{LK,MAX}$ transmitted in this way by the multidisk clutch 25 is reached at a time $t_2$ and is then maintained through appropriate control of the first operating device 26 by the control unit 27. If the driver changes the accelerator position, the control unit 27 may be arranged to provide a corresponding adjustment in the operation of the multidisk clutch 25. After reaching the maximum torque $M_{LK,MAX}$, the first gear, which was previously engaged, is disengaged at $t_3$ by disconnecting the clutch sleeve 21.

Engagement of the additional gear stage 23 also causes the engine speed $n_{MOT}$ to drop. After disengagement of the first gear, the engine speed drops to the point that the synchronous speed of the transmission input shaft 12 for engaging the second gear stage consisting of the gear wheel pair 17 is reached at $t_4$. In FIG. 4, the speed difference $n_{DIFF}$ is shown as the deviation in the speed of the transmission input shaft $n_{EIN}$ from the synchronous speed. At the time $t_4$, $n_{DIFF}=0$ and thus the synchronous speed is reached.

It can be seen in FIG. 4 that the engine speed $n_{MOT}$ drops steadily from the start of the shifting operation at time $t_1$ and reaches the synchronous speed at time $t_4$ with a reduction in the rate of change in speed approximately at or shortly before reaching the synchronous speed. The rate of change in engine speed $n_{MOT}$ is referred to herein as the gradient. The goal at this point is to avoid interrupting the application of torque to the transmission output shaft 22 if possible. At the same time, the actual shifting operation, i.e., engaging and disengaging the clutch sleeves 20 and 21, should require as little torque as possible.

To do this, as described above, at least part of the torque is transmitted through the additional gear stage 23. The drop in engine speed $n_{MOT}$ described here necessarily results from the torque $M_{LK}$ transmitted to the multidisk clutch 25. The torque $M_{LK}$ should be as constant as possible in the course of the shifting operation, but it is difficult to measure per se. The change in engine speed $n_{MOT}$, namely, the gradient, is used instead as a measure of the torque $M_{LK}$. In the present practical example, the speed $n_{MOT}$ is also the speed of the transmission input shaft $n_{EIN}$.

To control the torque $M_{LK}$ transmitted to the multidisk clutch 25, a certain gradient is selected and the first actuating device 26 is controlled by the control unit 27 in order to reach that torque. Preferably, the actual engine speed $n_{MOT}$ is measured at intervals, the instantaneous gradient is calculated, and the deviation of the gradient from a given set point is used to regulate the first actuating device 26. Thus, a closed-loop control circuit is utilized.

FIGS. 3 and 4 show that there is a constant clutch torque $M_{LK}$ and a constant gradient of the speed $n_{MOT}$ between the times $t_2$ and $t_3$. The speed $n_{MOT}$ is lowered to the point that the loose wheel of the pair of gear wheels 17 of the second gear is synchronized with the transmission output shaft 22 and the clutch sleeve 21 can then be actuated. This clutch engagement process requires a certain finite period of time. For this reason, the speed at the transmission input shaft $n_{EIN}$, and the engine speed $n_{MOT}$, should pass the synchronous point as slowly as possible. Ideally, the speed difference $n_{DIFF}(=n_{EIN}-$synchronous speed) should not become negative. In order to achieve this, the gradient is reduced after the time $t_3$ and before reaching the synchronous speed. This reduces the pressure in the multidisk clutch 25 and thus also the transmitted torque $M_{LK}$.

Various possibilities are provided for selecting the specific time to reduce the gradient. In one possibility, the gradient is reduced after a certain period of time which is measured from the start of the shifting operation $t_1$. In another version, the gradient is reduced after the actual transmission input speed $n_{EIN-IST}$ or the actual engine speed $n_{MOT-IST}$ has been reduced to provide a certain difference from the synchronous speed. Thus, the gradient is changed as a function of the difference between the actual speed and the synchronous speed. In still another version, the gradient is changed as a function of the difference between the actual transmission input speed $n_{EIN-IST}$ and the transmission input speed $n_{EIN}$ at the beginning of the shifting operation ($n_{EIN-START}$).

When the gradient is changed substantially from a given gradient value, there are large changes in the clutch torque $M_{LK}$. In order to limit such discontinuities in torque, it is advantageous to reduce the gradient several times and in small increments or continuously. Accordingly, a soft torque change curve is shown in FIG. 3.

FIG. 2 shows the variation of the torque $m_{AUS}$ on the transmission output shaft 22 during the shifting operation. Up to the time $t_1$, the torque transmitted by the first gear stage is fully effective. After the time $t_1$, the torque transmitted through the additional gear stage 23 is built up, while the torque transmitted through the first gear stage is reduced at the same time. At the time $t_2$, the first gear stage is released and most of the original torque is transmitted through the additional gear stage 23. At the time $t_3$, there is also a reduction in the output torque $M_{AUS}$ at the transmission output shaft 22 due to the change in gradient. At the time $t_4$, the gradient is lowest and thus also the output torque $M_{AUS}$ is at its lowest point. After engaging the second gear at the time $t_5$, the multidisk clutch 25 is released and all of the driving torque is transmitted through the second gear stage.

The torque $M_{LK}$ transmitted by the multidisk clutch 25 is selected so that a torque $M_{AUS}$, which corresponds to the torques transmitted by the engaged gear stages before and after the shifting operation, is produced at the transmission output shaft 22. Accordingly, the torque $M_{AUS}$ between the times $t_2$ and $t_3$ has a value which is somewhere between the torque $M_{AUS}$ up to time $t_1$ and the torque $M_{AUS}$ after time $t_5$. The gradient is thus not a fixed parameter but instead depends, among other things, on the torque $M_{MOT}$ of the driving engine and the gear stage to be engaged. The engine torque $M_{MOT}$ can be determined, for example, by measuring the pressure in the manifold passage of the engine.

Preferably, approximate characteristic data are stored in the control unit 27 to assign a gradient set point to each of a number of combinations of engine torque $M_{MOT}$ and transmission ratio. During the shifting operation, the gradient is monitored and regulated by an appropriate adjustment of the pressing force in the multidisk clutch.

In another embodiment of the invention, the transmission ratio of the original gear stage provides part of the stored characteristic data used as the basis for gradient adjustment. It is especially advantageous, although more expensive, to use a combination of both the original transmission ratio and the ratio of the gear stage into which the transmission is being shifted for this purpose. For example, it is conceivable that, after a heavy load and acceleration, the load is reduced and then it is possible to shift when driving to the next higher gear stage. The same thing is also true of shifting down. The transmission ratio of the new gear is thus not necessarily derived from the transmission ratio of either the old gear or the new gear alone.

The torque on the multidisk clutch 25 also depends on the moment of inertia associated with the transmission input shaft 12. This depends essentially on the rotating masses in the driving engine 15, the flywheel 14 and the separating clutch 13. The torques stored as part of the characteristic data are adjusted accordingly.

In addition, it is also possible, at least at low speeds, to select the gradient as a function of the engine speed. On the other hand, an undesirably low engine speed might be produced during the shifting process if the gradient were too large. In this case, the control unit might eliminate initiation of a shifting operation.

Figure 5:
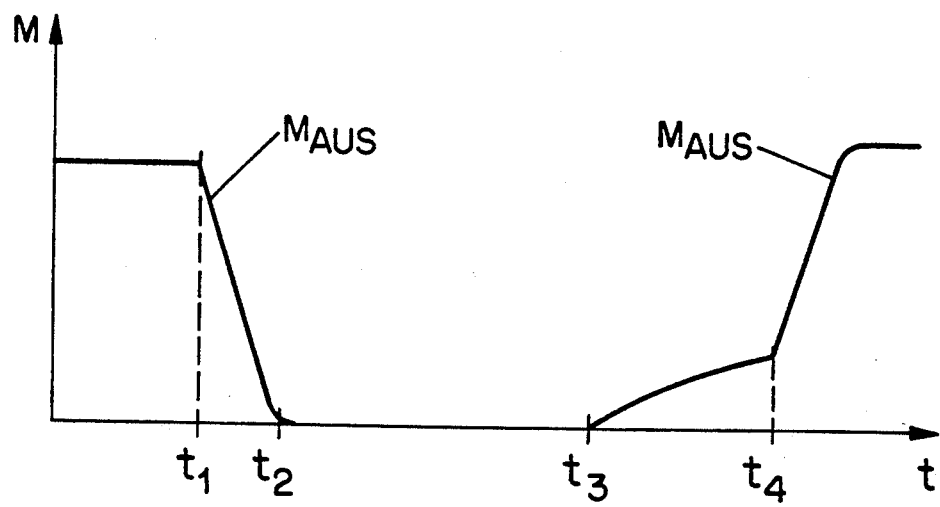
FIGS. 5-7 are graphical representations showing torque and speed variations corresponding to those of FIGS. 2-4 which occur during downshifting.
Figure 6:
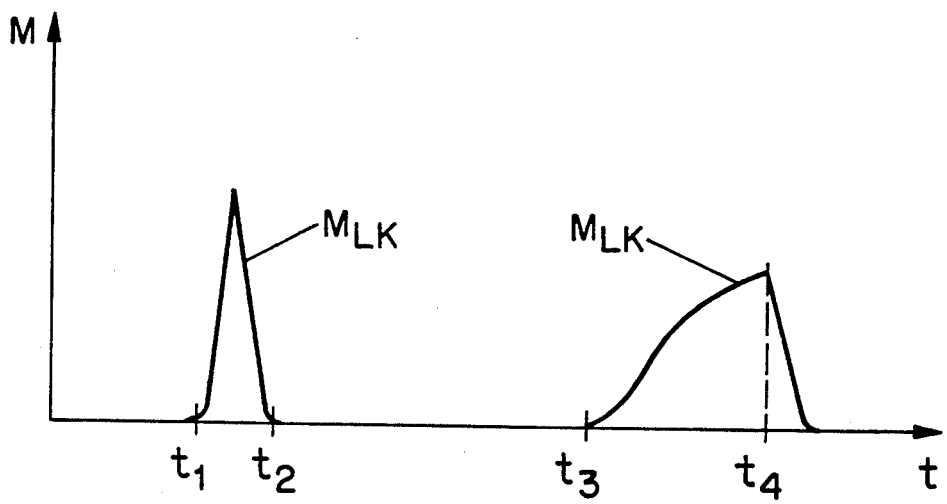
Figure 7:
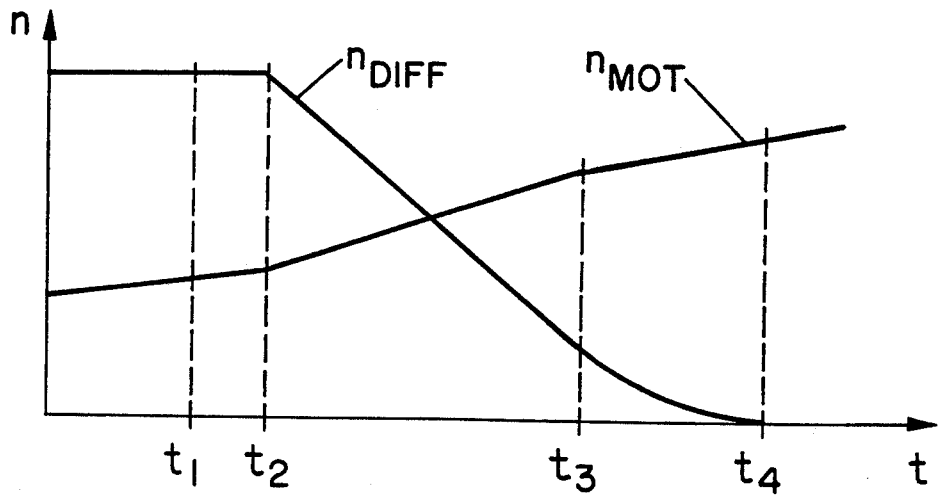

FIGS. 5-7 show the torque and speed curves for downshifting. In these illustrations, the times $t_1$-$t_4$ are the same throughout.

At the time $t_1$, i.e., at the beginning of the shifting operation, the multidisk clutch 25 is actuated briefly in order to remove torque from the engaged gear stage so that the clutch sleeve 21 can be disengaged from the loose wheel of the pair of gear wheels 17 by spring force. This process is completed at the time $t_2$. The engine then accelerates as a function of the accelerator position and optionally as a function of the torque control device 28 and in accordance with control signals from the control unit 27. For this purpose, an engine idling volumetric control valve may be controlled.

Before reaching the synchronous speed, i.e., before the speed difference is $n_{DIFF}=0$, the multidisk clutch 25 is actuated again at the time $t_3$. The clutch torque $M_{LK}$ transmitted by this actuation is shown in FIG. 6. The friction in the multidisk clutch 25 thus counteracts the acceleration of the engine so that there is a reduction in the gradient at the time $t_3$. control by using the gradient begins in shifting down after the time $t_2$ or after the time $t_3$. The gradient value used in shifting down is obtained from the stored characteristic data just as in shifting up. In another embodiment of this invention, to optimize the shifting operation, different characteristic data are stored for the downshifting operation.

At the time $t_4$, the synchronous speed is reached and the new gear, for example, the first gear, is engaged by actuating the clutch sleeve 21. At the same time, the multidisk clutch 25 is released again and the driving torque is then transmitted fully through the new gear.

When downshifting from the fifth gear stage, it is only necessary to release the multidisk clutch 25 to initiate the shifting operation in order to allow the full engine acceleration up to synchronous speed of the new lower gear stage. The remaining steps correspond to the process described above. Similarly, a shortened shifting operation takes place in shifting up into the fifth gear. After actuating the multidisk clutch 25, the fourth gear is disengaged by actuation of the clutch sleeve 20. Then the actuation of the multidisk clutch 25 is retained until complete engagement occurs and the additional gear stage 23 is used as the fifth gear.

In another embodiment, the start-up and separating clutch 13 is also involved in the shifting operation. In other words, this clutch is controlled by the second actuating device 30 in such a way that it transmits the torque applied to its input side only up to a certain maximum level. The multidisk clutch 25 can then be designed for lower loads and thus has a simpler design. Furthermore, this can lead to a substantial reduction in the cost of the control device, especially since the actuating device 30, which is usually provided for start-up anyway, can also be used to adjust the clutch torque $M_{LK}$ and the gradient as required in accordance with the shifting operation. In addition or as an alternative, such an adjustment can also be dependant on the engine torque applied.

Figure 8:
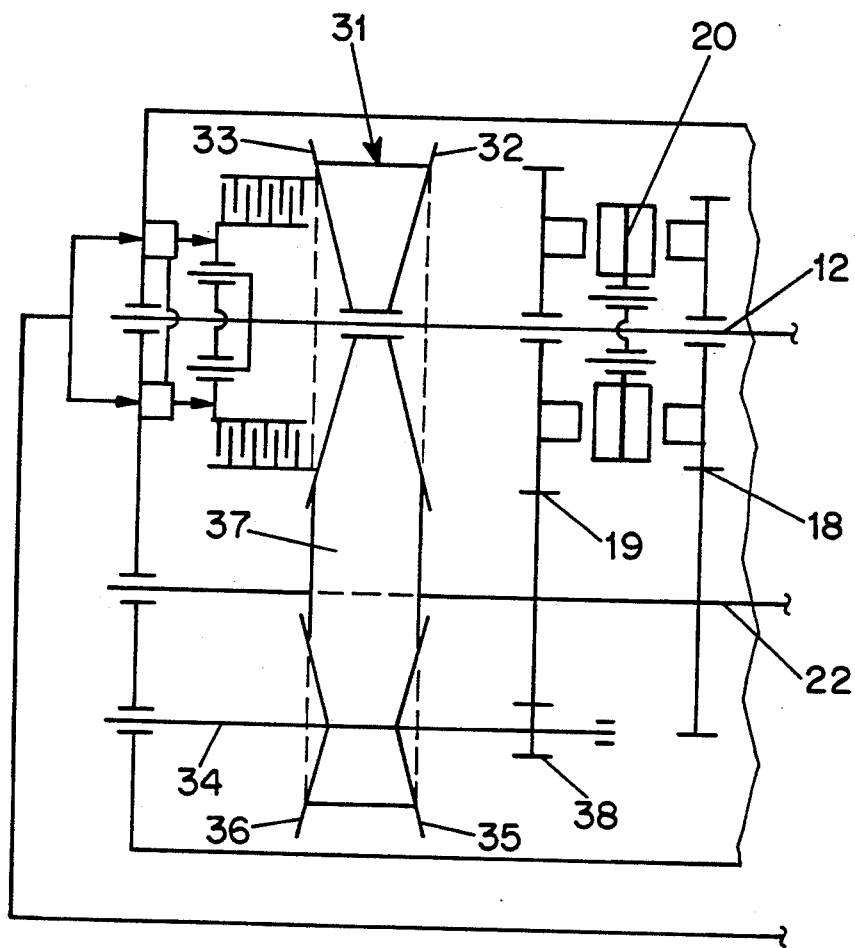
FIG. 8 is a schematic diagram showing another representative embodiment of a multistage transmission according to this invention.

FIG. 8 illustrates another embodiment of the multistage transmission of the invention. In contrast to FIG. 1, the loose wheels of the gear stages here are mounted on the transmission input shaft 12 and the fixed wheels are mounted on the transmission output shaft 22. The essential difference in comparison with the multistage transmission shown in FIG. 1 is that a gear stage 31 corresponding to the gear stage 23 in FIG. 1 is designed with a belt drive providing a continuously adjustable transmission ratio. For this purpose, two pulley halves 32 and 33 are mounted as loose wheels on the transmission input shaft 12 and two pulley halves 35 and 36 are provided on an intermediate shaft 34 and the pulleys are connected by a belt 37. A pinion 38 affixed to the intermediate shaft 34 engages the driven pinion of the gear wheel pair 19 of the fourth gear stage and thus permits the required reversal of direction of rotation which is necessary for proper driving of the transmission output shaft 22.

The transmission ratio of the gear stage 31 can be adjusted continuously by means of a conventional axial adjustment of the pulley halves 32 and 33 on the one hand, and the pulley halves 35 and 36 on the other hand. Like the multistage transmission of FIG. 1, the pulley halves 32 and 33 that rotate as loose wheels here can be connected to the transmission input shaft 12 by the multidisk clutch 25.

Because the transmission ratio can be adjusted continuously in the gear stage 31, the amount of driving torque to be transmitted through the gear stage that is to be engaged temporarily can be adjusted in accordance with the driving torque to be transmitted by the gear wheels engaged at the time of initiation and termination of the shifting operation. Thus, for example, the gear stage 31 can be adjusted to provide the transmission ratio of the second gear stage in shifting from first to second gear and this can be accomplished before the operation of upshifting. The second gear can thus be engaged as soon as a frictional engagement has been achieved in the multidisk clutch 25. At the same time, friction is reduced and the thermal output of the clutch and also its wear are minimized.

In another embodiment of the multistage transmission (not shown) similar to FIG. 1, the pulley halves 32 and 33 are arranged as fixed wheels on the transmission input shaft 12. These pulley halves are axially adjustable on the input shaft 12 such that no driving torque can be transmitted by the belt 37 at least temporarily and the degree of belt engagement can be varied The function of the multidisk clutch 25 is thus replaced by the interaction of the pulley halves 32 and 33 with the belt 37.

Although the invention has been described herein with reference to specific embodiments, many modifications and variations therein will readily occur to those skilled in the art. Accordingly, all such variations and modifications are included within the intended scope of the invention.

We claim:

1. A method of shifting a vehicle transmission having a transmission input shaft connectable to a drive motor, a transmission output shaft, a plurality of gear stages, each including a pair of gear wheels supported on the transmission input shaft and the transmission output shaft, respectively, one of each pair of gear wheels being fixed on its supporting shaft and the other of each pair of gear wheels being supported as a loose wheel on its supporting shaft and being connectable thereto by a coupling device for the purpose of engaging the corresponding gear, and at least one additional gear stage comprising applying torque from the transmission input shaft at least partly through the additional gear stage to the transmission output shaft in order to relieve a previously engaged gear stage and vary the speed of the transmission input shaft, disengaging the previously engaged gear stage by disconnecting the loose wheel thereof from the corresponding transmission shaft, synchronizing the speed of the transmission input shaft to a synchronous speed for a next gear stage to be engaged by controlling the change of speed of the transmission input shaft in accordance with a speed gradient value which is a function of at least one operating characteristic of the drive motor and engaging the next gear stage to be engaged by connecting the loose wheel thereof to the corresponding transmission shaft.

2. A method according to claim 1 wherein the change in speed of the transmission input shaft is accomplished by feedback and control of the speed gradient value thereof.

3. A method according to claim 1 wherein the speed gradient value is determined as a function of the engine torque or of the torque applied to the transmission input shaft.

4. A method according to claim 1 wherein the speed gradient value is determined as a function of at least one of the gear stages between which the transmission is being shifted.

5. A method according to claim 1 wherein the speed gradient value is reduced on approaching the synchronous speed to allow the next gear stage to be engaged.

6. A method according to claim 1 wherein the speed gradient value is reduced after a selected period of time following initiation of the input shaft speed change before reaching the synchronous speed.

7. A method according to claim 1 wherein the speed gradient value is reduced as a function of the proximity of the actual transmission input shaft speed to the synchronous speed and before reaching the synchronous speed.

8. A method according to claim 1 wherein the speed gradient value is reduced as a function of the absolute value of the difference between the instantaneous speed of the transmission input shaft and the transmission input shaft speed at the beginning of the shifting operation.

9. A method according to claim 1 wherein the transmission input shaft torque applied is determined by at least one of the pressure in the manifold passage of the motor, the speed gradient of the motor, and the moment of inertia of rotating parts associated with the input shaft.

10. A method according to claim 1 wherein the additional gear stage is connected to one of the transmission input and output shafts by an additional clutch that can be operated in a partially engaged condition and wherein either the engagement condition or the torque transmission is controlled by a change in the engaging force of the additional clutch.

11. A method according to claim 10 wherein the change in speed to attain the synchronous speed is controlled by the change in engaging force on the additional clutch.

12. A method according to claim 1 wherein the change in speed to attain the synchronous speed takes place by controlling the drive motor.

13. A method according to claim 10 wherein the change in speed to attain the synchronous speed in downshifting takes place first by controlling the drive motor and then by optional closing of the additional clutch just before reaching the synchronous speed.

14. A multistage vehicle transmission comprising a transmission input shaft connectable to a drive motor, a transmission output shaft, a plurality of gear stages, each including a pair of gear wheels supported on the transmission input shaft and the transmission output shaft, respectively, one of each pair of gear wheels being fixed on its supporting shaft and the other of each pair of gear wheels being supported as a loose wheel its supporting shaft and being connectable thereto by a coupling device for the purpose of engaging the corresponding gear, an additional gear stage with a transmission ratio which is smaller than that of at least one of the gear stages, and control means for controlling the speed change of the transmission input shaft in accordance with a speed gradient value which is a function of at least one operating characteristic of the drive motor by acting upon at least one of the drive motor and the additional gear stage.

15. A multistage transmission comprising a transmission input shaft connectable to a drive motor, a transmission output shaft, a plurality of gear stages, each including a pair of gear wheels supported on the transmission input shaft and the transmission output shaft, respectively, one of each pair of gear wheels being fixed on its supporting shaft and the other of each pair of gear wheels being supported as a loose wheel on its supporting shaft and being connectable thereto by a coupling device for the purpose of engaging the corresponding gear, an additional gear stage with a transmission ratio which is smaller than that of at least one of the gear stages, and control means for controlling the speed change of the transmission input shaft by acting upon at least one of the drive motor and the additional gear stage, wherein the gear ratio of the additional gear stage can be adjusted continuously or in stages.

* * * * *